US008695643B2

(12) United States Patent
Rajabi et al.

(10) Patent No.: US 8,695,643 B2

(45) Date of Patent: Apr. 15, 2014

(54) LIGHTWEIGHT HIGH PRESSURE REPAIRABLE PISTON COMPOSITE ACCUMULATOR WITH SLIP FLANGE

(75) Inventors: Bahram S. Rajabi, Belvidere, IL (US); Allen R. Hansen, Winnebago, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 1134 days.

(21) Appl. No.: 12/267,783

(22) Filed: Nov. 10, 2008

(65) Prior Publication Data

US 2009/0126815 A1 May 21, 2009

Related U.S. Application Data

(60) Provisional application No. 60/986,400, filed on Nov. 8, 2007.

(51) Int. Cl.
*F16L 55/04* (2006.01)

(52) U.S. Cl.
USPC ................................ 138/31; 138/30; 138/109

(58) Field of Classification Search
USPC .............................................. 138/30, 31, 109
See application file for complete search history.

(56) References Cited

U.S. PATENT DOCUMENTS

| | | | | |
|---|---|---|---|---|
| 1,590,587 A | | 6/1926 | McFarland | |
| 2,417,873 A | * | 3/1947 | Huber | 138/31 |
| 2,734,531 A | | 2/1956 | Bizak | |
| 2,742,929 A | * | 4/1956 | Treseder | 138/31 |
| 2,800,924 A | | 7/1957 | Antrim, Jr. | |
| 3,004,560 A | | 10/1961 | Leffler et al. | |
| 3,084,717 A | | 4/1963 | Purcell | |
| 3,171,563 A | | 3/1965 | Bernd | |
| 3,307,730 A | | 3/1967 | Davidson | |
| 3,348,578 A | | 10/1967 | Mercier | |
| 3,490,344 A | | 1/1970 | Archer et al. | |
| 3,581,774 A | | 6/1971 | Oeland, Jr. et al. | |
| 3,696,714 A | * | 10/1972 | Panigati | 92/170.1 |
| 3,847,182 A | | 11/1974 | Greer | |
| 3,863,676 A | | 2/1975 | Tarsha | |
| 4,126,157 A | * | 11/1978 | Roest | 138/109 |
| 4,355,662 A | | 10/1982 | Floyd | |
| 4,386,627 A | | 6/1983 | Lachaux | |
| 4,510,959 A | | 4/1985 | Gidick | |
| 4,561,568 A | | 12/1985 | Hoffmeister et al. | |
| 4,575,422 A | | 3/1986 | Zimmer | |
| 4,603,711 A | | 8/1986 | Porel | |
| 4,644,976 A | | 2/1987 | Peter et al. | |

(Continued)

FOREIGN PATENT DOCUMENTS

EP 0701065 3/1996

*Primary Examiner* — James Hook
(74) *Attorney, Agent, or Firm* — Renner, Otto, Boisselle & Sklar, LLP

(57) ABSTRACT

A reduced weight and repairable piston accumulator. The accumulator includes a load bearing metallic cylinder with removable end caps secured thereto with slip flanges for allowing repairability and for achieving the required cycle life. The cylinder serves as the surface on which the piston slides and is designed such that it sustains the axial stress induced by pressurization of the accumulator. A composite over wrapping is designed such that it sustains the stress in the hoop (radial) direction. A stress transitioning bushing can be provided for transitioning hoop stresses between the overwrap and the slip flange. When combined with the cylinder, the fibers of the composite wrap will not be placed in shear and thus will not fatigue in the same manner as some prior art designs.

7 Claims, 4 Drawing Sheets

(56) References Cited

U.S. PATENT DOCUMENTS

| | | | | |
|---|---|---|---|---|
| 4,714,094 | A | 12/1987 | Tovagliaro | |
| 4,778,073 | A | 10/1988 | Ehs | |
| 4,823,976 | A | 4/1989 | White, III et al. | |
| 4,905,856 | A | 3/1990 | Krogager | |
| 4,961,760 | A | 10/1990 | Caskey et al. | |
| 4,966,200 | A | 10/1990 | Bents | |
| 5,025,943 | A | 6/1991 | Forsman | |
| 5,087,409 | A | 2/1992 | Wedellsborg et al. | |
| 5,121,852 | A | 6/1992 | Wilkes | |
| 5,178,753 | A | 1/1993 | Trabold | |
| 5,181,319 | A | 1/1993 | Campbell, Jr. | |
| 5,224,621 | A | 7/1993 | Cannan, Jr. et al. | |
| 5,253,778 | A | 10/1993 | Sirosh | |
| 5,287,987 | A | 2/1994 | Gaiser | |
| 5,499,739 | A | 3/1996 | Greist, III et al. | |
| 6,332,477 | B1 | 12/2001 | Scholl et al. | |
| 6,357,966 | B1 | 3/2002 | Thompson | |
| 6,398,382 | B1 | 6/2002 | Boyce et al. | |
| 6,401,963 | B1 | 6/2002 | Seal et al. | |
| 6,418,970 | B1 | 7/2002 | Deul | |
| RE38,163 | E | 7/2003 | Spero | |
| 6,834,680 | B2 | 12/2004 | Baugh | |
| 6,971,411 | B1 | 12/2005 | Draper | |
| 7,048,009 | B2 | 5/2006 | Verhaeghe | |
| 7,208,207 | B2 | 4/2007 | Ono et al. | |
| 2003/0111473 | A1 | 6/2003 | Carter et al. | |
| 2003/0233751 | A1 | 12/2003 | Franks | |
| 2004/0026431 | A1 | 2/2004 | Jones | |
| 2006/0054231 | A1 * | 3/2006 | Wolfram et al. | 138/109 |
| 2007/0007405 | A1 | 1/2007 | Al-Mayah et al. | |
| 2008/0308168 | A1 | 12/2008 | O'Brien, II et al. | |
| 2008/0314467 | A1 * | 12/2008 | Gray, Jr. | 138/31 |
| 2009/0126816 | A1 * | 5/2009 | Rajabi et al. | 138/31 |

* cited by examiner

LIGHTWEIGHT HIGH PRESSURE REPAIRABLE PISTON COMPOSITE ACCUMULATOR WITH SLIP FLANGE

RELATED APPLICATIONS

This application claims the benefit of U.S. Provisional Application No. 60/986,400 filed Nov. 8, 2007, which is hereby incorporated herein by reference.

FIELD OF THE INVENTION

The present invention relates generally to a lightweight composite high pressure piston accumulator.

BACKGROUND OF THE INVENTION

Demand for lightweight accumulators is increasing, especially for mobile applications (e.g., aircraft, motor vehicles, etc.) where extra weight can reduce fuel efficiency. One example of a mobile application of an accumulator is in a hybrid powertrain for a vehicle. The term “Hybrid” generally refers to the combination of one or more conventional internal combustion engines with a secondary power system. The secondary power system typically serves the functions of receiving and storing excess energy produced by the engine and energy recovered from braking events, and redelivering this energy to supplement the engine when necessary. The secondary power system acts together with the engine to ensure that enough power is available to meet power demands, and any excess power is stored for later use. This allows the engine to operate more efficiently by running intermittently, and/or running within its most efficient power band more often.

Several forms of secondary power systems are known. Interest in hydraulic power systems as secondary systems continues to increase. Such systems typically include one or more hydraulic accumulators for energy storage and one or more hydraulic pumps, motors, or pump/motors for power transmission. Hydraulic accumulators operate on the principle that energy may be stored by compressing a gas. An accumulator’s pressure vessel contains a captive charge of inert gas, typically nitrogen, which becomes compressed as a hydraulic pump pumps liquid into the vessel, or during regenerative braking processes. The compressed fluid, when released, may be used to drive a hydraulic motor to propel a vehicle, for example. Typically operating pressures for such systems may be between 3,000 psi to greater than 7,000 psi, for example.

As will be appreciated, since the accumulator stores energy developed by the engine or via regenerative braking processes, it plays an important role in achieving system efficiency. One type of accumulator that may be used is commonly referred to as a standard piston accumulator. In a standard piston accumulator, the hydraulic fluid is separated from the compressed gas by means of a piston which seals against the inner walls of a cylindrical pressure vessel and is free to move longitudinally as fluid enters and leaves and the gas compresses and expands.

The piston is typically made of a gas impermeable material, such as steel, that prevents the gas from mixing with the working fluid. Keeping the gas from mixing with the working fluid is desirable, especially in high pressure applications such as hydraulic hybrid systems, to maintain system efficiency and avoid issues related with removing the gas from the working fluid.

In order to maintain a sufficient seal, the dimensional tolerance at the interface between the piston and the inner wall of the cylinder is generally very close. Further, the pressure vessel typically must be extremely rigid and resistant to expansion near its center when pressurized, which would otherwise defeat the seal by widening the distance between the piston and cylinder wall. This has generally eliminated the consideration of composite materials for high pressure piston accumulator vessels like those used in a hybrid system, for example, as composite materials tend to expand significantly under pressure (e.g., about 1/10 of an inch diametrically for a 12 inch diameter vessel at 5,000 psi pressure). Furthermore, the need to assemble the cylinder with a piston inside traditionally requires that the cylinder have at least one removable end cap for use in assembly and repair, rather than the integral rounded ends that are more structurally desirable in efficiently meeting pressure containment demands with composite materials. Composite pressure vessels are not easily constructed with removable end caps.

As a result of the foregoing, standard piston accumulator vessels tend to be made of thick, high strength steel and are very heavy. Standard piston accumulators have a relatively high weight to energy storage ratio as compared to other types of accumulators (e.g., bladder-type accumulators), which makes them undesirable for mobile vehicular applications (as such increased weight would, for example, reduce fuel economy for the vehicle). Therefore, despite their potentially superior gas impermeability, conventional piston accumulators are largely impractical for vehicular applications.

Another known composite accumulator uses an aluminum liner for both the piston travel surface and main liner of the pressure vessel. This design eliminates the need to pressure balance a secondary liner (e.g. by pressurizing the space between the main and secondary liner), but suffers from low fatigue endurance. The low fatigue endurance is usually caused by the difficulty of getting the aluminum liner (or other thin metal liner) to properly load share with the composite. Without the addition of an autofrettage process, this type of accumulator will have exceptionally low fatigue life. With an autofrettage process, the liner will grow erratically along its length making an adequate piston seal on the trapped piston nearly impossible resulting in gas mixing with the working fluid.

As noted, a consideration for accumulators in hydraulic hybrid systems is repairability. As noted, composite bladder accumulators are difficult to construct with removable end caps that would allow repair/replacement of the bladder and/or seals. Thus, in the event of seal failure, the entire accumulator is inoperable and must be discarded. To the degree that lightweight composite accumulators have had low cycle requirements or have been used on equipment that replacement was acceptable (aircraft, military vehicles, etc.), the use of such non-repairable bladder accumulators has been an acceptable practice. Placing lightweight accumulators in systems that are more commercial in nature and in larger numbers, however, makes non-repairable accumulators both financially and environmentally unsound.

U.S. Pat. No. 4,714,094 describes a repairable piston accumulator in which the all of the stresses (e.g., axial and hoop) are designed to be sustained by a composite overwrap. As a consequence of making a large enough opening for repairability and maintaining a thin non-load bearing liner (or minimally load bearing liner), the required primary wrap angle of the composite becomes 55 degrees placing some shear stress into the composite fibers. The shear stress is an undesirable condition and requires a second circumferential wrap to compensate for the stress. Thus, while the accumulator is repairable, the design likely fails to give the fatigue characteristics demanded by current and future uses of lightweight hydraulic accumulators.

SUMMARY OF THE INVENTION

The present invention provides a reduced weight and repairable piston accumulator. The accumulator includes a load bearing metallic cylinder with removable end caps secured thereto with slip flanges for allowing repairability and for achieving the required cycle life. The cylinder serves as the surface on which the piston slides and is designed such that it sustains the axial stress induced by pressurization of the accumulator. A composite wrapping is designed such that it sustains the stress in the hoop (radial) direction. The wind angle of the composite wrap can be, for example, between about 75 and about 90 degrees. When combined with the cylinder, the fibers of the composite wrap will not be placed in shear and thus will not fatigue in the same manner as some prior art designs.

In an embodiment, the cylinder of the accumulator is open at one end. In an alternative embodiment, the cylinder may be open at both ends. An autofrettage process may be done and the cylinder bore finished machined after the autofrettage. This allows for close tolerance piston seal and longer fatigue life on the cylinder. A bushing transitions stresses from the relatively low modulus central portion of the cylinder to the relatively high modulus slip flange area. The bushing produces a significant improvement in fatigue life over threaded caps (e.g., caps threaded onto the cylinder ends) and also helps to achieve the required fatigue life for high pressure applications such as hybrid transmission systems.

Accordingly, an accumulator comprises a liner having an open end and a radially outwardly extending shoulder at the open end, a composite overwrap wrapped around the liner for carrying hoop stress applied to the liner, a cap for closing the open end of the liner, and a slip flange for connection to the cap with the shoulder of the liner trapped between the cap and the slip flange.

A stress transition bushing can be provided in an area of transition between the overwrap and the slip flange for transitioning hoop stress from the overwrap region to the slip flange. The bushing can be tapered, for example, such as along its axial length such that it has a greater radial dimension at an end nearest the shoulder of the liner the slip flange. The slip flange can include a counterbore, and the bushing can be received at least partially within the counterbore. The counterbore can be tapered along its axial length so as to have a greater radius at an end nearest the overwrap, for example. The bushing can also be at least partially overwrapped with the composite overwrap. An inner diameter of the slip flange can engage an outer diameter of the liner, and at least a portion of the inner diameter of the slip flange that engages the outer diameter of the liner can be tapered along its axial length. The liner can have a thickness of approximately 0.375 inches, for example, but virtually any thickness can be used with sufficient overwrapping. The bushing can be a steel or carbon composite bushing. The accumulator can further include a pressure balanced liner and/or a piston supported for sliding axial movement within the accumulator and forming separate chambers within the accumulator.

In accordance with another aspect, a method of making an accumulator comprises forming a liner with an open end and with a radially outwardly extending shoulder at the open end thereof, positioning a slip flange over the liner axially inwardly of the radially outwardly extending shoulder, and closing the open end by securing a cap to the slip flange such that the shoulder of the cylindrical liner is trapped between the slip flange the cap. The forming the liner can include machining the liner from a tubular blank such as a conventional steel bladder accumulator liner, for example.

Further features of the invention will become apparent from the following detailed description when considered in conjunction with the drawings.

DETAILED DESCRIPTION

Figure 2:
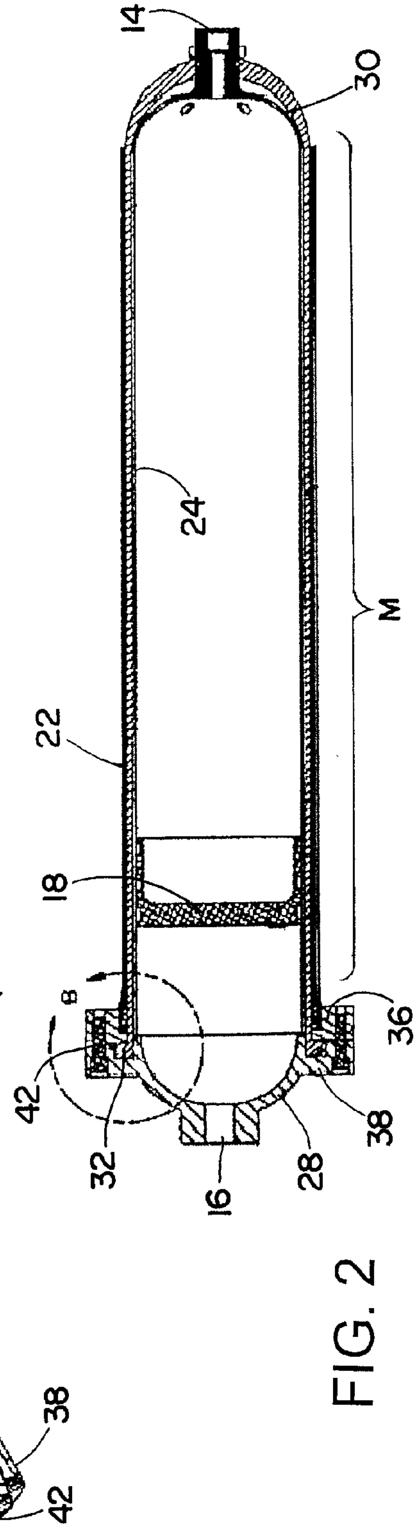
FIG. 2 is a longitudinal cross-sectional view of the accumulator of FIG. 1.
Figure 1:
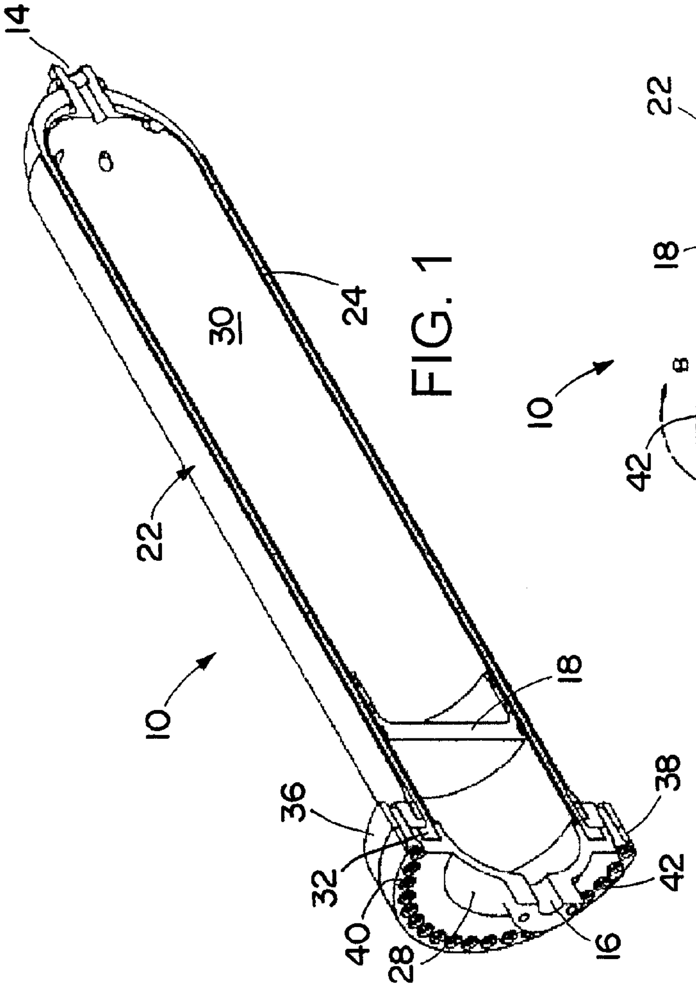
FIG. 1 is a cut-away perspective view of an exemplary accumulator in accordance with the invention.

Turning now to the drawings in detail, and initially to FIGS. 1 and 2, an exemplary lightweight, high pressure and repairable accumulator 10 is illustrated. The accumulator 10 is generally an elongate structure having an opening 14 at one end for receiving a fitting for connection to a gas source, such as high pressure nitrogen, and an opening 16 at the opposite end for receiving a fitting for connection to a hydraulic fluid source, such as a pump of a hybrid transmission system. A piston 18 is supported within the accumulator 10 and is displaced axially during pressurization/depressurization of the accumulator 10.

The accumulator 10 is made from fiber overwrap 22, typically composed of carbon and glass fibers, for example, that is wrapped around a tubular load bearing high strength steel liner 24 that is preferably cylindrical and also commonly referred to as a cylinder or shell. As will be appreciated, a composite material generally consists of two or more phases on a macroscopic scale whose mechanical performance and properties are designed to be superior to those of the constituent materials acting independently. One phase is usually discontinuous, stiffer and stronger and is called reinforcement, whereas the weaker phase is continuous and is called the matrix. Various types of fiber reinforcement include Glass, Carbon, Aramid and Boron, for example. Typical matrix materials include Polymers (e.g., Epoxy, Polyester, Thermoplastics), Metals (e.g., Aluminum, magnesium) and Ceramics.

In general, the steel liner 24 is designed to sustain the axial stress developed under pressurization of the accumulator 10, while the composite overwrap 22 is designed to sustain the radial stress, also sometimes referred to as hoop stress, developed during pressurization. The ratio of carbon and glass in the composite overwrap will vary with the wrap layer and/or particular design of the accumulator 10.

The composite overwrap 22 is typically wrapped in a largely circumferential manner with a wind angle of, for example, between about 75 to about 90 degrees with respect to the longitudinal axis of the accumulator 10, to provide a maximum of strength in the hoop stress direction and a minimal amount in the axial direction. The composite overwrap 22 in the illustrated embodiments is also thicker at the ends to reduce and/or prevent flaring of the ends of the steel liner 24.

In the illustrated embodiment, one end of the steel liner 24 is formed as a dome, while the opposite end is closed by a releasably securable domed cap 28. Between formed dome end and the domed cap end 28 is the midsection M generally defined as the region of the liner 24 that is overwrapped. A pressure balanced liner 30, which may be steel or aluminum and may have a thickness between about 0.125-0.250 inches for example, can also be optionally provided as shown. The piston 18 includes a seal (not shown) for sealing against the pressure balanced liner 30 or the steel liner 24 in the absence of a pressure balanced liner 30. For example, a bidirectional seal can be used that can compensate for changes in diameter of the steel liner 24 that may occur under pressure.

Figure 3:
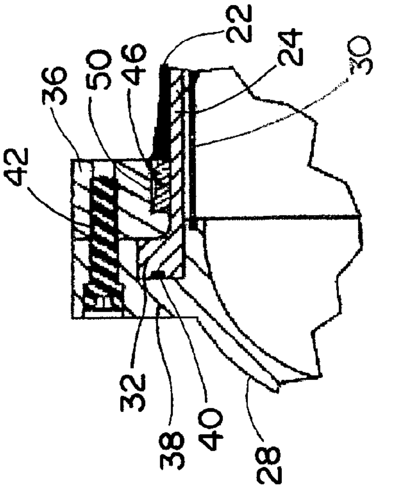
FIG. 3 is an enlarged portion of FIG. 2 showing an exemplary slip flange connection.

With reference to FIG. 3, details of the connection between the domed cap 28 and steel liner 24 are illustrated. The steel liner 24 has a shoulder 32 machined or otherwise formed at an end thereof and adapted to be engaged by a slip flange 36 telescoped over the liner 24. The slip flange 36 is preferably a unitary annular piece that can be telescoped over the liner 24 as shown, but may alternatively be multiple pieces connected together and/or separately to the domed cap 28. The domed cap 28 has an integral boss 38 with a groove for receiving the shoulder 32 of the liner 24, and for mating with a corresponding surface of the slip flange 36 such that the shoulder 32 is trapped between the cap 28 and the slip flange 36. A seal 40 is also provided for sealing the sleeve 24 to the domed cap 28. The domed cap 28 and slip flange 36 are secured together with suitable fasteners 42, such as screws or bolts, for example. As will be described in more detail below, the slip flange connection provides a robust connection that not only permits removal of the domed cap 28, but also is designed to gradually transition hoop stresses from the central portion M of the accumulator 10 to the slip flange 36 to avoid damaging the steel liner 24.

The slip flange connection in FIGS. 1-3 includes a stress transition bushing 46 received in a counterbore 50 of the slip flange that is interposed between the slip flange 36 and the steel liner 24 for gradually transitioning stresses through the slip flange 36. The bushing 46 can be a steel or carbon composite bushing, for example, and may be tapered and/or shaped so as to provide a gradual transition for the less stiff region to the right of the slip flange 36 in FIG. 3, to the more stiff region of the slip flange 36. Similarly, the counterbore 50 can be shaped to achieve a similar effect, as will be described.

Turning now to FIGS. 4-13, various exemplary embodiments of the slip flange connection will be described. Each of the following exemplary embodiments tends to reduce the concentration of bending stresses in the steel liner 24 that may occur due to bending moments generated during pressurization of the accumulator adjacent the slip flange 36. The concentration in bending may be exacerbated by sealing the bore at the right end, eliminating any pressure load outboard of the seal.

Figure 4:
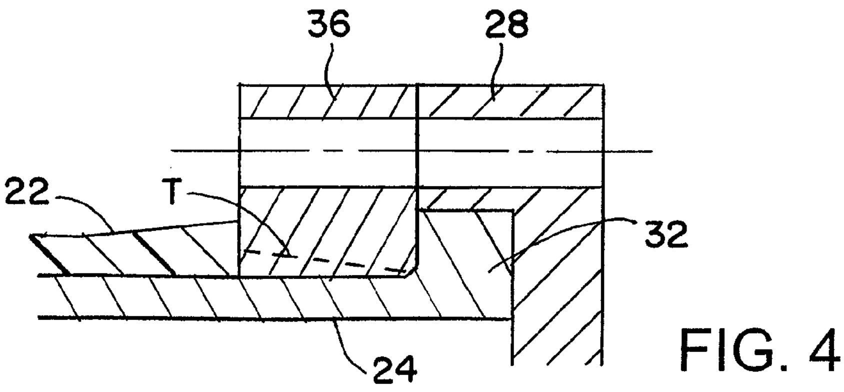
FIG. 4 is a cross-sectional view of an exemplary close-fit slip flange connection.

FIG. 4 illustrates a simple close slip fit or minor interference fit slip flange connection. In this embodiment, the slip flange 36 engages, along its axial length, the outer diameter surface of the liner 24. No bushing is used, and high tensile fatigue stresses may occur on the inside in some applications if the slip flange bore is not tapered. To reduce such fatigue stresses, the slip flange bore can be tapered such that its diameter is greater on the side closer to the overwrap 22, thereby allowing more expansion approaching the left face of the slip flange 36. Such taper is represented in FIG. 4 by dotted line T. For simplicity, the domed cap 28 is only being shown in FIG. 4.

Figure 5:
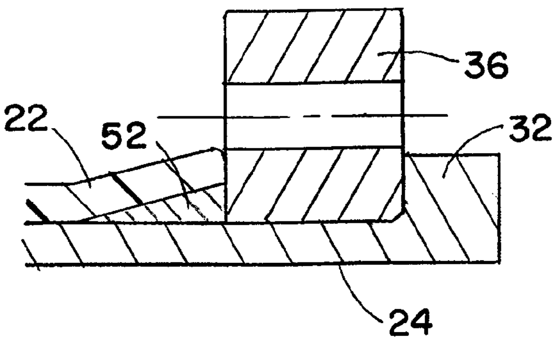
FIG. 5 is a cross-sectional view of an exemplary slip flange connection including a bushing.

FIG. 5 illustrates a tapered steel bushing 52 adjacent the slip flange 36 and under the overwrap 22. The steel bushing 52 is generally retained by the overwrap 22 and gradually transitions stresses between the relative stiff slip flange 36 to the more compliant composite midsection region M. The bushing 52 is subject to high hoop fatigue stresses at its thin edge, so it typically will be made from high-strength-steel and finished well. The gap between the slip flange and the bushing and composite overwrap 22 may breathe during cycling.

Figure 6:
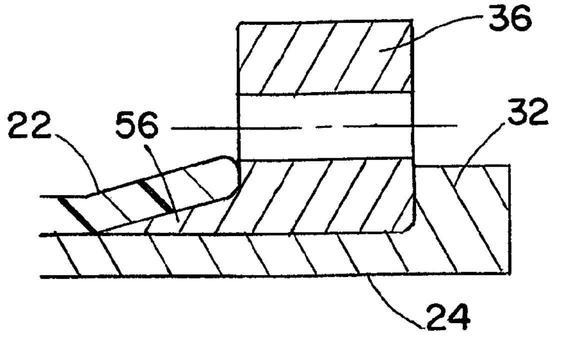
FIGS. 6-13 are cross-sectional views of various other exemplary slip flange connections.

FIG. 6 illustrates a slip flange 36 having a tapered transition section 56 formed therewith as an integral piece. This embodiment is similar to the embodiment of FIG. 5 except that the bushing 52 of FIG. 5 is essentially part of the slip flange 36 of FIG. 6. This design would generally eliminate any tendency for the joint to breathe.

Figure 7:
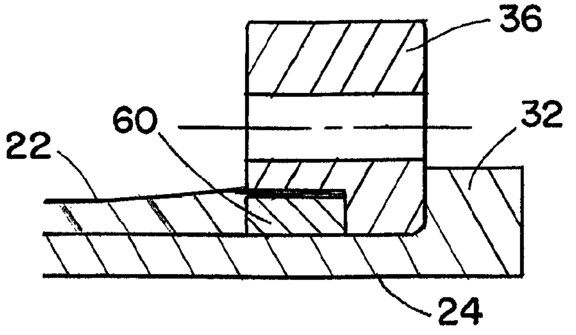

FIG. 7 illustrates a carbon composite wrapped bushing 60 in a tapered counterbore 50. Alternatively, the bushing 60 may be tapered in a straight counterbore 50. In either case, the bushing 60 is interposed between the overwrap 22 and the steel liner 24. By varying the clearance along the axial length of the bushing 60, the stiffness can be transitioned from high at the right end to lower at the left. This embodiment may require precision machining. In order to sustain the potentially very high compressional loads, the wrapped bushing 60 can be made from a bidirectional composite in order to resist cracking under the compressive loads.

Figure 8:
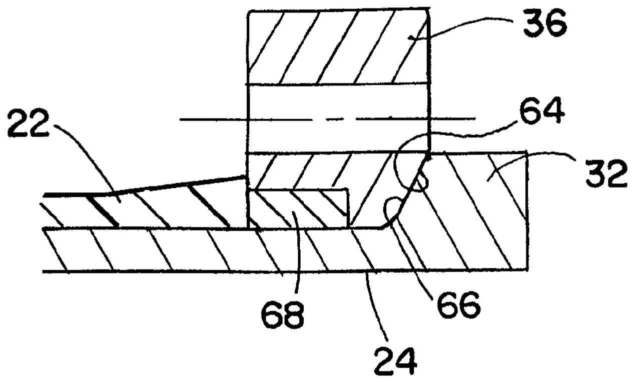

FIG. 8 illustrates a slip flange 36 having a slanted face 64 for engaging a corresponding angled face 66 on the shoulder 32 of the steel liner 24. The forward slant face 64 tends to rotate the liner shoulder 32 to the right and reduce the stress concentration at the slip flange 36 and steel sleeve 24. A bushing 68, such as any one of the herein described bushing, can be used as shown. Alternatively, a close-fit design such as the design of FIG. 4 can be used.

Figure 9:
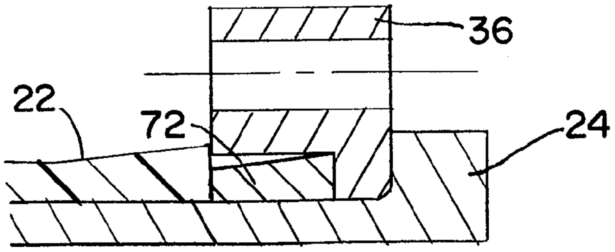

FIG. 9 illustrates a tapered carbon bushing 72 in a loose-fit counterbore of slip flange 36. The bushing 72 provides a transition in stiffness without the close machining of the design of FIG. 7.

Figure 10:
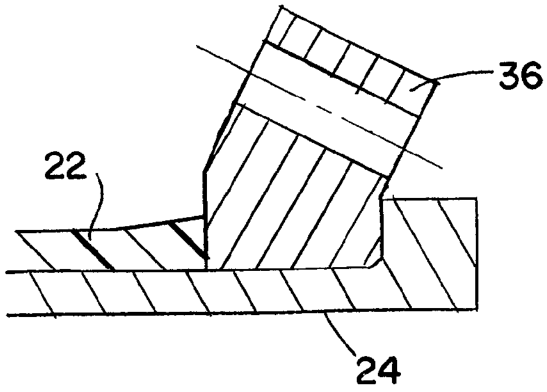

FIG. 10 illustrates another slip flange connection wherein the slip flange bolts holes are angled to bring their centerline closer to the applied pressure loads. This design typically will reduce the moments in the slip flange 36 by moving the stress concentration point from the flange corner to the flange edge, but manufacturing would be considerably more complicated. Any of the bushing designs disclosed herein could also be used in connection with this embodiment as well.

Figure 11:
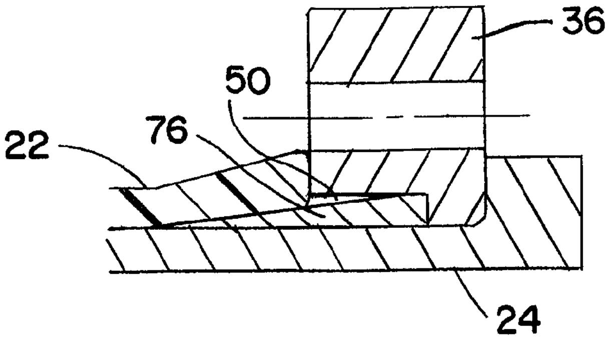

FIG. 11 illustrates a long tapered steel bushing 76 partially received in the slip flange counterbore 50. The bushing 76 extends axially from the counterbore of the slip flange 36, and increases the length of transition without adding weight (for example, compare to the bushing of FIG. 5).

Figure 12:
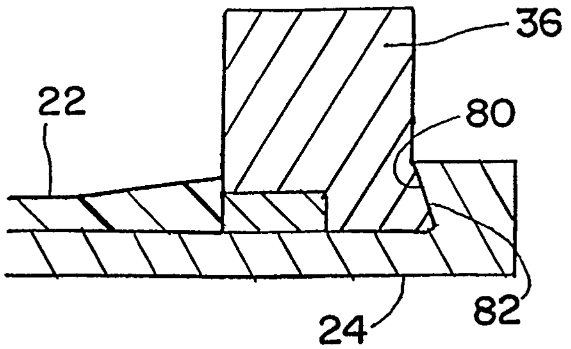

FIG. 12 illustrates a slip flange 36 having a slanted face 80 for engaging a corresponding angled face 82 on the shoulder 32 of the steel liner 24 in a dovetail fashion.

Figure 13:
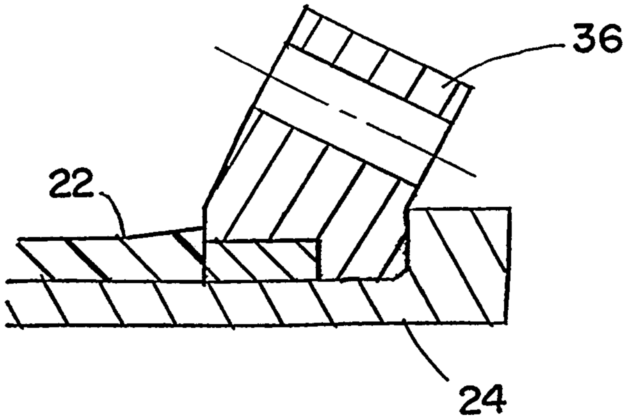

FIG. 13 illustrates a combination of the designs of FIGS. 8 and 10.

In the forgoing designs including a bushing, the bushing can have any suitable taper angle such as, for example, between about 15 and about 25 degrees.

It will be appreciated the accumulator 10 of the present invention is not only significantly lighter than equivalent sized steel designs, it is also repairable. The reduction in weight is generally made possible by relying on a thinner steel liner 24 combined with composite overwrapping, while the slip flange connection between the steel liner 24 and the domed cap 28 provides a robust yet releasably securable manner connecting the two parts. An accumulator of the present invention can accommodate a wide range of pressures such as from 3,000 psi to 10,000 psi, for example.

It will be appreciated that the steel liner 24 may be open at both ends, and domed caps 28 can be installed on each end in the same manner as described above. In either case, the domed cap(s) 28 allow access to the piston 18 for repair and/or replacement, thus making the accumulator 10 repairable.

As will also be appreciated, an autofrettage process may be performed on the steel liner 24. After such process, the steel liner bore may be finish machined for accepting the piston 18. This allows for a close tolerance piston seal and longer fatigue life on the steel liner 24.

As an example, one manner in which an accumulator in accordance with the invention can be made includes starting with a tubular blank such as a steel liner for a steel piston accumulator. The steel blank has a starting wall thickness that is then machined down to decrease the wall thickness thereby reducing weight. At the same time, the radially outwardly extending shoulder is formed at an end of the sleeve surrounding an opening. Although machining is preferably, the shoulder could be formed by other processes, such as forging. The machined liner is then overwrapped with a composite wrap to increase its strength in the hoop direction. The opening of the liner is then closed with a cap as set forth above. This results in a repairable, reduced weight accumulator having pressure capacities similar to the full weight conventional steel piston accumulator.

Although the invention has been at least partially described in the context of a hybrid transmission system for a vehicle, the invention is applicable to a wide variety of hydraulic and/or pneumatic systems, and is particularly applicable to mobile systems where reduced vehicle weight can increase efficiency.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An accumulator comprising:

a pressure liner for carrying axial stress having an open end and a radially outwardly extending shoulder at the open end;

a composite overwrap wrapped around the liner for carrying hoop stress applied to the pressure liner;

a cap for closing the open end of the liner; and a slip flange for connection to the cap with the shoulder of the liner trapped between the cap and the slip flange, further including a stress transition bushing in an area of transition between the overwrap and the slip flange for transitioning hoop stress between the overwrap and the slip flange.

2. An accumulator as set forth in claim 1, wherein the bushing is tapered.

3. An accumulator as set forth in claim 2, wherein the bushing is tapered along its axial length such that it has a greater radial dimension at an end nearest the shoulder of the liner the slip flange.

4. An accumulator as set forth in claim 1, wherein the slip flange includes a counterbore, and the bushing is received at least partially within the counterbore.

5. An accumulator as set forth in claim 4, wherein the counterbore is tapered along its axial length so as to have a greater radius at an end nearest the overwrap.

6. An accumulator as set forth in claim 1, wherein the bushing is at least partially overwrapped with the composite overwrap.

7. An accumulator as set forth in claim 1, wherein the bushing is a carbon composite bushing.

* * * * *